United States Patent Office 3,312,246
Patented Apr. 4, 1967

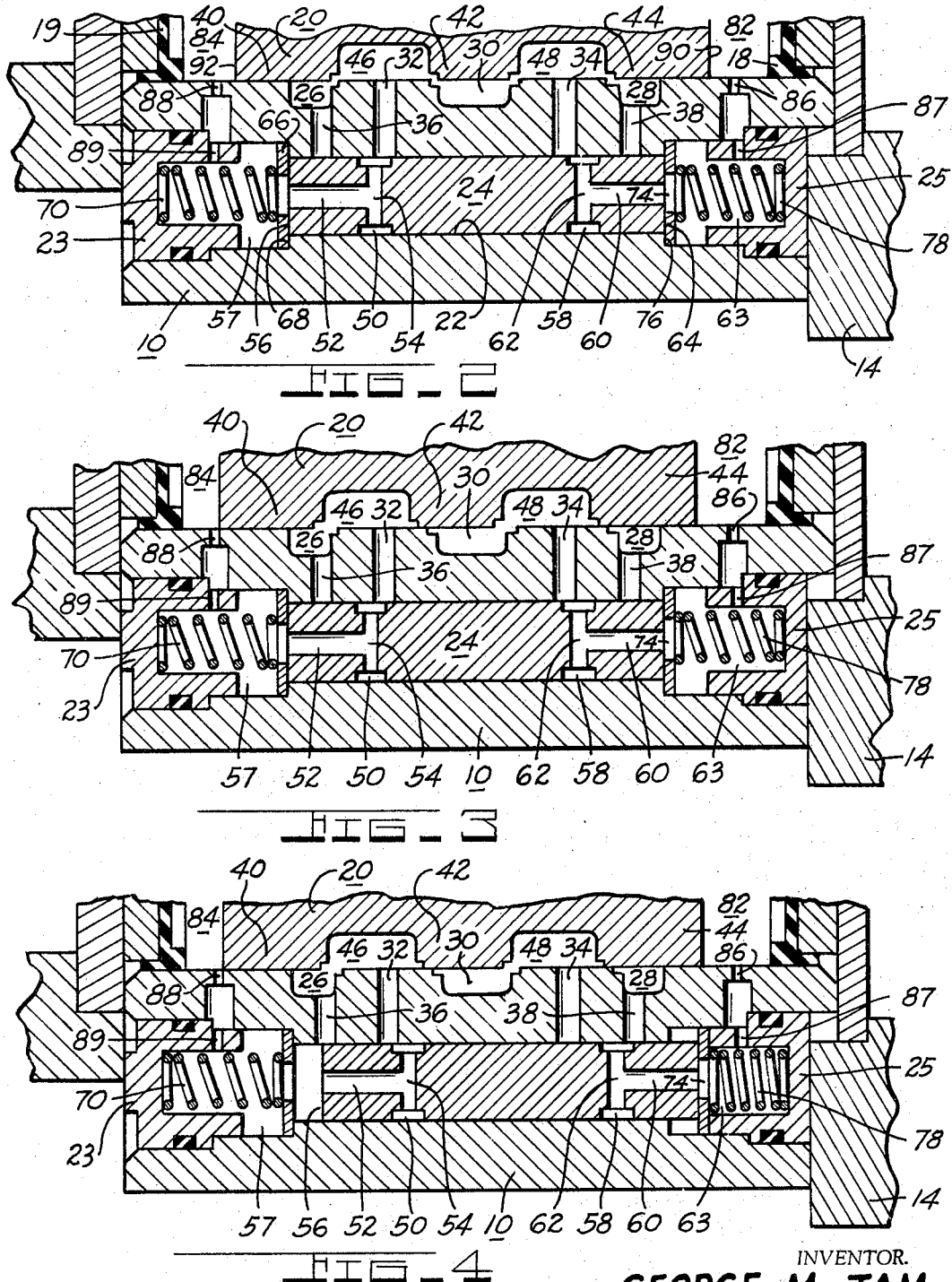

3,312,246
POWER STEERING VALVE
George M. Tam, South Bend, Ind., assignor to The Bendix Corporation, St. Joseph, Mich., a corporation of Delaware
Filed Sept. 21, 1964, Ser. No. 397,744
5 Claims. (Cl. 137—625.69)

This invention relates to a valve for use in power steering.

An object of this invention is to provide a valve for power steering which is free from causing front wheel instability when a vehicle is either turning or traveling in a straight path.

Another object of this invention is to effect prevention of front wheel instability by communicating a pair of chambers to a pressure inlet which act on a power cylinder control valve member to dampen movement thereof in opposite directions.

A further object of the invention is to provide a power steering control valve which not only prevents instability but also provides for steering "reaction" or "feel" to a vehicle operator by providing a pressure differential between the damping chambers.

Still a further object of the invention is to provide a power steering control valve which not only prevents instability but also provides for a limited steering "feel" by providing a limited pressure differential between the damping chambers.

Other objects of the invention will become more apparent from the following description with reference to the drawings wherein:

FIGURE 2 is an enlarged partial view of FIGURE 1 illustrating the power cylinder control valve and the hydraulic reaction chamber control valve in neutral position;

Figure 1:
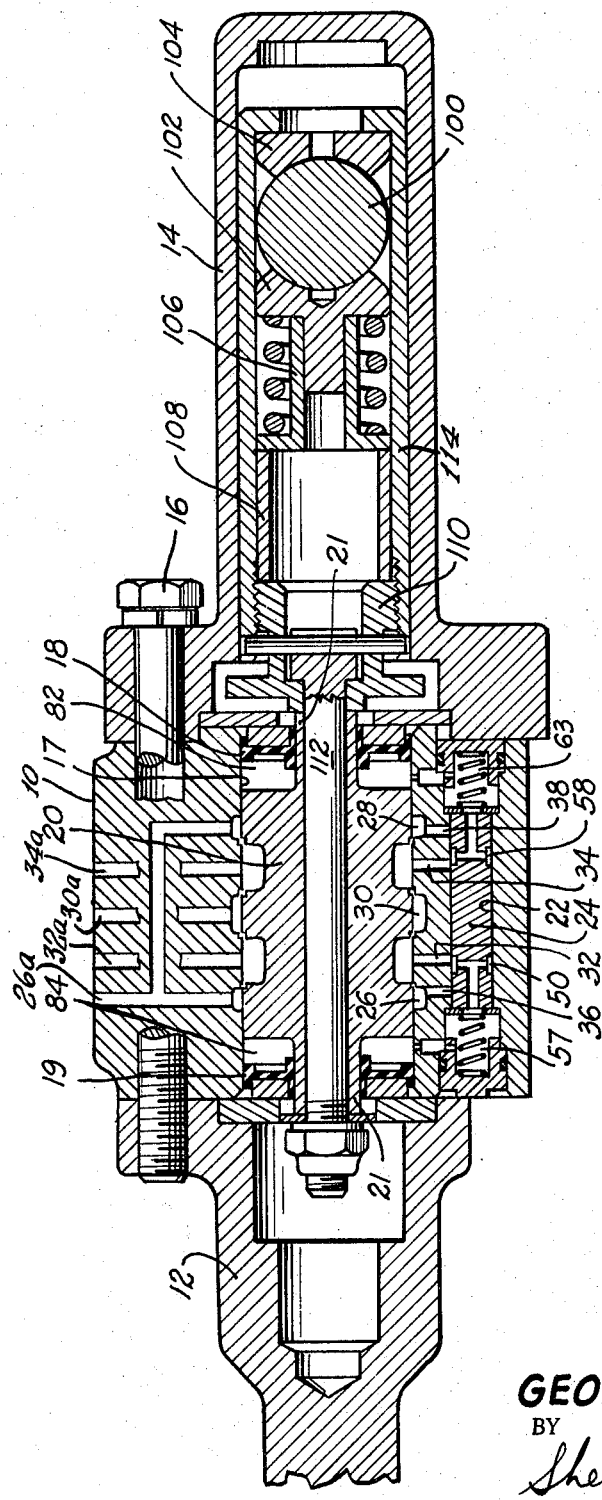
FIGURE 1 is a sectional view of both a power cylinder control valve and a control valve for hydraulic reaction chambers.

FIGURE 3 is a view similar to FIGURE 2 illustrating the power cylinder control valve in one operating position while the control valve for the hydraulic reaction chambers remains in neutral position; and FIGURE 4 is a view similar to FIGURE 2 wherein the power cylinder control valve is in said one operating position and the control valve for the hydraulic reaction chambers is in one operating position.

Referring to FIGURES 1 and 2, there is illustrated a valve body 10, a drag link 12 and an actuator housing 14 all interconnected by a plurality of bolts 16 (only one bolt shown). The valve body 10 has a bore 17 receiving a slidable spool valve 20 therein and also has a bore 22 for receiving a slide valve 24 therein. The ends of the bore 17 are defined by a pair of annular sealing members 18 and 19 each slidably receiving a tubular end 21 of the valve spool 20 therethrough. The ends of the bore 22 are defined by a pair of stationary spring retainers 23 and 25. A pressure inlet 26a, a reservoir outlet 30a, a left turn power cylinder outlet 32a, and a right turn power cylinder outlet 34a are located on the valve body 10 and are communicated with a pair of annular pressure grooves 26, 28, an annular return groove 30, a cylinder port 32, and a cylinder port 34, respectively. The cylinder ports 32 and 34 are also communicated to the bore 22 and the annular grooves 26 and 28 are communicated to the bore 22 by ports 36 and 38, respectively. The spool valve 20 has three lands 40, 42 and 44 which correspond with the annular grooves 26, 30 and 28, respectively, in the neutral position illustrated in FIGURE 2. The middle land 42 is separated from the outer land 40 by an annular groove 46 on the valve spool and is separated from the outer land 44 by an annular groove 48 in the valve spool.

An annular groove 50 and an axial passage 52 communicated to the annular groove 50 by a cross passage 54 communicates one end 56 of the slide valve 24 and a chamber 57 with the pressure in either the cylinder port 32 or in the pressure port 36. An annular groove 58 and an axial passage 60 communicated to the groove 58 by a cross passage 62 communicates the other end 64 of the slide valve 24 and a chamber 63 with either the cylinder port 34 or the pressure port 38. The ends 56 and 64 of the slide valve 24 are of equal area. A washer 66 is biased against a shoulder 68 on the valve body 10 by a spring 70 which is supported by the stationary spring retainer 23 and a washer 74 is located at the other end of the slide valve 24 and biased against a shoulder 76 on the valve body 10 by a spring 78 which is supported by the stationary retainer 25. The length of the slide valve 24 is such that the washers 66 and 74 will engage the ends thereof in the position shown in FIGURE 2.

A combination hydraulic reaction and damping chamber 82 is located at one end of the spool valve 20 and a combination hydraulic reaction and damping chamber 84 is located at the other end of the valve spool 20. The chamber 82 is communicated past an orifice 86 and a port 87 in the spring retainer 25 to the chamber 63 and the chamber 84 is communicated past an orifice 88 and a port 89 in the spring retainer 23 to the chamber 57. The pressure in chamber 82 acts on an annular surface 90 at its respective end of the valve spool to bias the valve spool 20 to the left and the pressure in chamber 84 acts on an annular surface 92 at its respective end of the valve spool to bias the valve spool 20 to the right. The annular surfaces 90 and 92 are of equal area in this instance but may be of different areas.

The actuator for shifting the valve spool 20 comprises a ball stud 100 supported by stud seats 102 and 104. The stud 100 is interconnected to the valve spool 20 for moving the same to the left by a spring retainer 106, a spacer sleeve 108 and a stop nut 110 which is connected to the spool 20 by a spool bolt 112. A slidable inner sleeve 114 carries the aforementioned members and is threadedly secured to the stop nut 110 to interconnect the stud 100 to the valve spool 20 for moving the same to the right. The steering linkage may be of any conventional type with a pitman arm connected to the stud 100 for actuating the same.

In operation, assuming a person wishes to make a left turn, the ball stud 100 will be actuated to shift the spool valve 20 to the left, as shown in FIGURE 3, whereby land 40 and groove 46 communicate the pressure inlet groove 26 with the left turn cylinder port 32 to communicate pressure to one side of a power cylinder (not shown). The land 42 cuts off communication between the return groove 30 and the left turn cylinder port 32 and the land 42 and the groove 48 communicate the right turn cylinder port 34 with the return groove 30 while land 44 cuts off the cylinder port 34 from the pressure groove 28. The slide valve 24 remains in neutral position with the pressure in the left turn cylinder port 32 being communicated through the annular groove 50, the cross passage 32, the axial passage 52, chamber 57, port 89 and the orifice 88 to the combination hydraulic reaction and damping chamber 84 whereby the pressure in the chamber 84 acts on the surface 92 to oppose movement of the valve spool 20 to the left creating steering "reaction" or "feel." The combination hydraulic reaction and damping chamber 82 is communicated through the orifice 86, port 87, chamber 63, axial passage 60, cross passage 62, and the annular groove 58 to the right turn cylinder port 34 which is communicated to the return groove 30. The force of each spring 70 and 78 is set to be overcome by a predetermined resultant pressure acting on either end of the slide valve 24. For instance, the predetermined pressure may be 100 p.s.i. Therefore, the pressure in chamber 84 will build up to 100 p.s.i. more than the pressure in chamber 82, and then act on the end 56 of the sleeve valve 24 to overcome the force of the spring 78 to shift the slide valve from its normal position to the right (FIGURE 4) against the spring retainer 25 wherein the annular groove 58 comes into communication with the pressure port 38. Pressure is then communicated past the groove 58, the cross passage 62, the axial passage 60, the chamber 63, the port 87, and the orifice 86 into the chamber 82 whereupon the pressure supplied to the chamber 82 acts against the annular surface 90 of the valve spool 20 to offset any increase in pressure in the chamber 84 above a 100 p.s.i. differential. Once the pressure in chamber 84 reaches 100 p.s.i. greater than the pressure in chamber 82, the pressure differential remains constant upon any further increase in pressure. Thus, the reaction force opposing movement of the valve spool 20 to the left is limited and at the same time utilization of damping in each of the chambers 82 and 84 is achieved to limit the rate of fluid flow from the chambers 82 and 84 thereby preventing vehicle steering instability.

If the valve spool 20 is shifted to the right, the right hand cylinder port 34 will be pressurized and the valve spool 24 will be shifted to the left upon the pressure in chamber 82 reaching 100 p.s.i. more than the pressure in chamber 84 and thereafter the pressure differential between the chambers 82 and 84 upon an increase in pressure will remain at 100 p.s.i.

From the above it can be seen that I have provided a power steering valve assembly wherein damping means for the power cylinder control valve is provided along with a limited reaction force opposing the shifting of the power cylinder control valve. It is my intention to include all embodiments and variations of this construction which come within the scope of the following claims.

I claim:

1. A valve for power steering or the like comprising: a housing member having a bore therein, pressure port means, first and second cylinder port means, and return port means; a valve member located in said bore and movable in opposite directions from a neutral position for controlling flow between said port means; said pressure port means being communicated to said first cylinder port means and said second cylinder port means being communicated to said return port means upon movement of said valve member in one direction, and said pressure port means being communicated to said second cylinder port means and said first cylinder port means being communicated to said return port means upon movement of said valve member in the opposite direction; first and second pressure chambers; said valve member having first and second opposed surfaces, the first of which is exposed to the pressure in said first chamber and the second of which is exposed to the pressure in said second chamber; said chambers and surfaces being arranged relative to each other so that the pressure in said first chamber acting on said first surface will oppose movement of said valve member in one direction and the pressure in said second chamber acting on said second surface will oppose movement of said valve member in the opposite direction; valve means communicated with said cylinder port means, said pressure port means and said pressure chambers for normally communicating said first cylinder port means with said first pressure chamber and for normally communicating said second cylinder port means with said second pressure chamber; said valve means being responsive to a predetermined pressure differential in said pressure chambers for communicating the lower pressure chamber to said pressure port means and cutting off communication between said lower pressure chamber with its respective cylinder port means; and means for actuating said valve member.

2. A valve for power steering or the like comprising: a housing member having a bore therein, pressure port means, first and second cylinder port means, and return port means; a valve member located in said bore and movable in opposite directions from a neutral position for controlling flow between said port means; said pressure port means being communicated to said first cylinder port means and said second cylinder port means being communicated to said return port means upon movement of said valve member in one direction, and said pressure port means being communicated to said second cylinder port means and said first cylinder port means being communicated to said return port means upon movement of said valve member in the opposite direction; means for actuating said valve member; first and second pressure chambers; said valve member having first and second opposed surfaces, the first of which is exposed to the pressure in said first chamber and the second of which is exposed to the pressure in said second chamber; said chambers and surfaces being arranged relative to each other so that the pressure in said first chamber acting on said first surface will oppose movement of said valve member in one direction and the pressure in said second chamber acting on said second surface will oppose movement of said valve member in the opposite direction; a slide valve element having first and second passage means therein communicated with said first pressure chamber and said second pressure chamber respectively, said first and second passage means being isolated from each other; said first passage means being in communication with said first cylinder port means when said slide valve element is in a normal position and in communication with said pressure port means when said slide valve element is shifted in a first direction away from said normal position to a first operating position thereof; said second passage means being in communication with said second cylinder port means when said slide valve element is in a normal position and in communication with said pressure port means when said slide valve element is moved in a second direction away from said normal position to a second operating poistion thereof; resilient means acting on each end of said slide valve element to urge the same towards said normal position; one end of said slide valve element being exposed to pressure in said first pressure chamber and arranged so that the pressure acting thereon will urge said slide valve element in said second direction and the other end of said slide valve element being exposed to said second pressure chamber and being arranged so that the pressure acting thereon will urge said slide valve element in said first direction to shift said slide valve to one of said operating positions when the pressure differential between said pressure chambers reaches a value determined by the force of said resilient means opposing movement of said slide valve element.

3. A valve for power steering or the like comprising: a housing member having a bore therein, pressure port means, first and second cylinder port means, and return port means; a valve member located in said bore and movable in opposite directions from a neutral position for controlling flow between said port means, said pressure port means being communicated to said first cylinder port means and said second cylinder port means being communicated to said return port means upon movement of said valve member in one direction, and said pressure port means being communicated to said other cylinder port means and said one cylinder port means being communicated to said return port means upon movement of said valve member in the opposite direction; means for actuating said valve member; first and second pressure chambers; said valve member having first and second opposed surfaces, the first of which is exposed to the pressure in said first chamber and the second of which is exposed to the pressure in said second chamber; said chambers and surfaces being arranged relative to each other so that the pressure in said first chamber acting on said first surrace will oppose movement of said valve member in one direction and the pressure in said second chamber acting on said second surface will oppose movement of said valve member in the opposite direction; a slide valve element mounted for movement in the same general directions as said valve member, said slide valve element having first and second passage means therein communicated with said first pressure chamber and said second pressure chamber respectively, said first and second passage means being isolated from each other; said first passage means being in communication with said first cylinder port means when said slide valve element is in a normal position and in communication with said pressure port means when said slide valve element is shifted in a first direction away from said normal position to a first operating position thereof; said second passage means being in communication with said second cylinder port means when said slide valve element is in a normal position and in communication with said pressure port means when said slide valve element is moved in a second direction away from said normal position to a second operating position thereof; resilient means acting on each end of said slide valve element to urge the same towards said normal position; one end of said slide valve element being exposed to pressure in said first pressure chamber and arranged so that the pressure acting thereon will urge said slide valve element in said second direction and the other end of said slide valve element being exposed to said second pressure chamber and being arranged so that the pressure acting thereon will urge said slide valve element in said first direction, whereby said slide valve element will be shifted to an operating position in a direction opposite to that in which said valve member is shifted when the pressure differential in said chambers reaches a value determined by the force of said resilient means opposing movement of said slide valve element.

4. A valve for power steering or the like comprising: a housing having parallel first and second bores; a common wall separating said bores; a spool valve member slidable in said first bore; a slide valve element slidable in said second bore; each of said bores having pressure port means and first and second cylinder port means; said port means being located in said common wall; said first bore further having return port means; said spool valve member having lands and grooves thereon arranged to communicate said first cylinder port means with said pressure port means and said second cylinder port means to said return port means when said spool valve member is moved in one direction to a first operating position and to communicate said second cylinder port means with said pressure port means and communicate said first cylinder port means with said return port means when said spool valve member is moved in the opposite direction to a second operating position; means for actuating said spool valve member; first and second pressure chambers located at opposite ends of said first bore; said spool valve member having first and second opposed surfaces, the first of which is exposed to the pressure in said first chamber and the second of which is exposed to the pressure in said second chamber; said chambers and surfaces being arranged relative to each other so that the pressure in said first chamber acting on said first surface will oppose movement of said spool valve member in one direction and the pressure in said second chamber acting on said second surface will oppose movement of said spool valve member in the opposite direction; said slide valve element having first and second passage means therein communicated with said first pressure chamber and said second pressure chamber respectively, said first and second passage means being isolated from each other; said first passage means being in communication with said first cylinder port means when said slide valve element is in a normal position and in communication with said pressure port means when said slide valve element is shifted in a first direction away from said normal position to a first operating position thereof; said second passage means being in communication with said second cylinder port means when said slide valve element is in a normal position and in communication with said pressure port means when said slide valve element is moved in a second direction away from said normal position to a second operating position thereof; resilient means acting on each end of said slide valve element to urge the same towards said normal position; one end of said slide valve element being exposed to pressure in said first pressure chamber and arranged so that the pressure acting thereon will urge said slide valve element in said second direction and the other end of said slide valve element being exposed to pressure in said second pressure chamber and arranged so that the pressure acting thereon will urge said slide valve element in said first direction, whereby said slide valve element will be shifted to an operating position in a direction opposite to that in which said spool valve member is shifted when the pressure differential in said chamber reaches a value determined by the force of said resilient means opposing movement of said slide valve element.

5. A valve for power steering or the like comprising: a housing having parallel first and second bores; a common wall separating said bores; a spool valve member slidable in said first bore; a slide valve element slidable in said second bore; each of said bores having a first and second pressure port means and first and second cylinder port means located axially of said bores between said pressure port means; said port means being located in said common wall; said first bore further having return port means located between said cylinder port means; said spool valve member having lands and grooves thereon arranged to communicate with said first cylinder port means with said first pressure port means and said second cylinder port means to said return port means when said spool valve member is moved in one direction to a first operating position and to communicate said second cylinder port means with said second pressure port means and communicate said first cylinder port means with said return port means when said spool valve member is moved in the opposite direction to a second operating position; means for actuating said spool valve member; first and second pressure chambers located at opposite ends of said first bore; said spool valve member having first and second opposed surfaces, the first of which is exposed to the pressure in said first chamber and the second of which is exposed to the pressure in said second chamber; said chambers and surfaces being arranged relative to each other so that the pressure in said first chamber acting on said first surface will oppose movement of said spool valve member in one direction and the pressure in said second chamber acting on said second surface will oppose movement of said spool valve member in the opposite direction; said slide valve element having first and second passage means therein communicated with said first pressure chamber and said second pressure chamber, respectively; said first and second passage means being isolated from each other; said first passage means being in communication with said first cylinder port means when said slide valve element is in a normal position and in communication with said first pressure port means when said slide valve element is shifted in a first direction away from said normal position to a first operating position thereof; said second passage means being in communication with said second cylinder port means when said slide valve element is in a normal position and in communication with said second pressure port means when said slide valve element is moved in a second direction away from said normal position to a second operating position thereof; resilient means acting on each end of said slide valve element to urge the same towards said normal position; one end of said slide valve element being exposed to pressure in said first pressure chamber and arranged so that the pressure acting thereon will urge said slide valve element in said second direction and the other end of said slide valve element being exposed to pressure in said second pressure chamber and arranged so that the pressure acting thereon will urge said slide valve element in said first direction, whereby said slide valve element will be shifted to an operating position in a direction opposite to that in which said spool valve member is shifted when the pressure differential in said chambers reaches a value determined by the force of said resilient means opposing movement of said slide valve element.

References Cited by the Examiner

UNITED STATES PATENTS

| | | | |
|---|---|---|---|
| 2,893,505 | 7/1959 | Schultz | 91—371 X |
| 2,919,681 | 1/1960 | Schultz | 137—596.12 X |
| 2,930,361 | 3/1960 | MacDuff | 91—371 |
| 2,934,089 | 4/1960 | Meyers | 137—625.63 |

M. CARY NELSON, *Primary Examiner.*

HENRY T. KLINKSIEK, *Examiner.*